(12) United States Patent
Hanschke et al.

(10) Patent No.: US 11,385,677 B2
(45) Date of Patent: Jul. 12, 2022

(54) CLOCK DATA RECOVERY CIRCUIT

(71) Applicant: TEXAS INSTRUMENTS INCORPORATED, Dallas, TX (US)

(72) Inventors: Michael Ryan Hanschke, Wylie, TX (US); Pankaj Pandey, McKinney, TX (US); Joseph Pham, Plano, TX (US); David Wayne Evans, Bentonville, AR (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/039,260

(22) Filed: Sep. 30, 2020

(65) Prior Publication Data

US 2021/0096592 A1    Apr. 1, 2021

Related U.S. Application Data

(60) Provisional application No. 62/908,362, filed on Sep. 30, 2019.

(51) Int. Cl.
*H04L 7/04* (2006.01)
*G06F 1/14* (2006.01)
*G06F 11/16* (2006.01)
*H04L 7/00* (2006.01)

(52) U.S. Cl.
CPC ............ *G06F 1/14* (2013.01); *G06F 11/1604* (2013.01); *H04L 7/0037* (2013.01); *H04L 7/0045* (2013.01)

(58) Field of Classification Search
CPC ..... H04L 7/048; H04L 7/0037; H04L 7/0045; G06F 11/14; G06F 11/1604
See application file for complete search history.

(56) References Cited

U.S. PATENT DOCUMENTS 5,245,635 A * 9/1993 Martinez ................... H04L 7/02 327/261
5,864,250 A * 1/1999 Deng ..................... H04L 7/0276 327/165
10,763,844 B2 9/2020 Bang et al.

* cited by examiner

*Primary Examiner* — Hai L Nguyen
(74) *Attorney, Agent, or Firm* — Michael A. Davis, Jr.; Charles A. Brill; Frank D. Cimino

(57) ABSTRACT

A clock data recovery circuit includes a deglitch filter circuit and a timer circuit. The deglitch filter circuit is configured to remove pulses of less than a predetermined duration from a data signal to produce a deglitched data signal. The timer circuit is coupled to the deglitch filter, and is configured to compare a duration of a pulse of the deglitched data signal to a threshold duration, and identify the pulse as representing a logic one based on the duration of the pulse exceeding the threshold duration.

8 Claims, 7 Drawing Sheets

CLOCK DATA RECOVERY CIRCUIT

CROSS-REFERENCE TO RELATED APPLICATION

This application claims priority to U.S. Provisional Patent Application No. 62/908,362, filed Sep. 30, 2019, entitled "Clock Data Recovery Architecture for High-Speed Communication Across a HV Isolation Channel," which is hereby incorporated herein by reference in its entirety.

BACKGROUND

Isolation is useful in electrical circuits to prevent the flow of direct currents and undesirable alternating currents between two parts of a system. While preventing flow of undesirable currents between parts of a system, isolation may allow signal transfer between the isolated parts of the system. Isolation may be provided by integrated circuits referred to as isolators. Electronic systems may include isolators for safety reasons and/or to protect electronic components of the systems. For example, where two systems need to communicate, but the systems have grounds that may be at different potentials, communication may be through an isolator that is tied to the grounds of both systems, but which allows no current flow between the grounds. Various types of isolators may include optical coupling, capacitive coupling, inductive coupling, or other types of coupling to isolate systems while allowing communication between the systems.

SUMMARY

A clock data recovery circuit and isolator circuit including the clock data recovery circuit are described herein. In one example, a clock data recovery circuit includes a signal input terminal, a recovered data output terminal, a deglitch filter circuit, a timer circuit, a delayed pulse circuit, and a flip-flop. The deglitch filter circuit includes a data input terminal coupled to the signal input terminal, and a deglitched data output terminal. The timer circuit includes an enable terminal coupled to the deglitched data output terminal of the deglitch filter circuit, a bit output terminal, and a reset terminal. The delayed pulse circuit includes an input terminal coupled to the deglitched data output terminal of the deglitch filter circuit, and a pulse output terminal coupled to the reset terminal of the timer circuit. The flip-flop includes a data input coupled to the bit output terminal of the timer circuit, a clock input coupled to the deglitched data output terminal of the deglitch filter circuit, and an output coupled to the recovered data output terminal.

In another example, a clock data recovery circuit includes a deglitch filter circuit and a timer circuit. The deglitch filter circuit is configured to remove pulses of less than a predetermined duration from a data signal to produce a deglitched data signal. The timer circuit is coupled to the deglitch filter, and is configured to compare a duration of a pulse of the deglitched data signal to a threshold duration, and identify the pulse as representing a logic one based on the duration of the pulse exceeding the threshold duration.

In a further example, an isolator circuit includes a modulator circuit, an isolation capacitor, a demodulator circuit, and a clock data recovery circuit. The modulator circuit including an output. The isolation capacitor includes a first terminal coupled to the output of the modulation circuit, and a second terminal. The demodulator circuit includes an input coupled to the second terminal of the isolation capacitor, and an output terminal. The clock data recovery circuit includes a deglitch filter circuit and a timer circuit. The deglitch filter circuit is coupled to the output terminal of the demodulator circuit, and is configured to remove pulses of less than a predetermined duration from a data signal to produce a deglitched data signal. The timer circuit is coupled to the deglitch filter circuit, and is configured to compare a duration of a pulse of the deglitched data signal to a threshold duration, and to identify the pulse as representing a logic one based on the duration of the pulse exceeding the threshold duration.

DETAILED DESCRIPTION

Data communication across isolation barriers can be challenging to implement in high-noise, high voltage (HV) isolated gate driver environments and applications, such as the +/−15 ampere (A) switching of a HV Silicon Carbide (SiC) or HV insulated-gate bipolar transistor (IGBT) device used for charging in a power module, or used as a traction inverter in an electric vehicle (EV) or hybrid-electric vehicle (HEV). Various design challenges include optimizing for common mode transient immunity (CMTI), data throughput, propagation delay, power, and silicon area. Each isolation path can be area intensive due to the isolation medium (capacitive, transformer, resistive, optical, etc.). Therefore, limiting the number of isolation paths is often desirable. A technique for reducing the number of signal paths (or isolation mediums) for data communication includes combining clock and data into one signal, but some solutions are silicon area intensive, power hungry, noise sensitive, and overly complicated.

In one example of isolation circuit use, isolated gate driver circuits are used to transmit control signals to power transistors (such as IGBTs) arranged as high and low-side drivers. Switching of the transistors induces a large common mode transient (CMT) relative to the ground references of the high-side isolated gate driver circuit. Some applications, such as automotive applications, can have power stages that slew the switch node connecting the power transistors between 0 volts (V) and 1 kilovolt (KV) with slew rates in excess of 100V/nanosecond. An isolated gate driver circuit's ability to maintain signal or data integrity during common mode transients is known as common mode transient immunity. Isolation mediums are easily corrupted by CMTs due to random mismatches and high sensitivities to parasitics.

Clock data recovery circuits for high-speed communication across a HV isolation channel is described herein. The clock data recovery circuits provide high CMTI. Noise filtering is provided by a deglitch filter, and power consumption and circuit area are reduced by re-clocking the data without a delay-locked loop (DLL).

Figure 1:
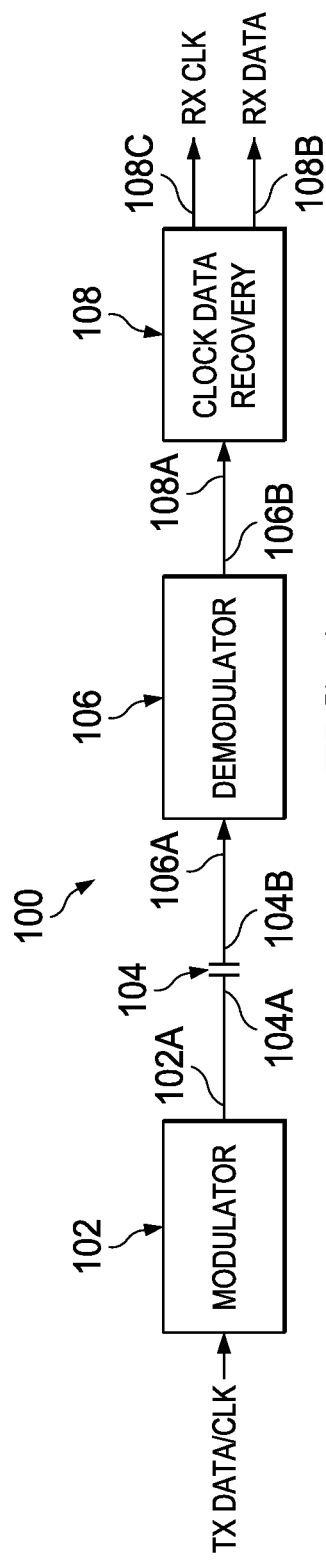
FIG. 1 shows a block diagram for an example isolator circuit in accordance with this description.

FIG. 1 shows a block diagram for an example isolator circuit 100 in accordance with this description. The isolator circuit 100 includes a modulator circuit 102, an isolation capacitor 104, a demodulator circuit 106, and a clock data recovery circuit 108. The modulator circuit 102 receives a clock/data signal (TX DATA/CLK) to be transmitted across ground domains through the isolation capacitor 104. The modulator circuit 102 modulates the clock/data signal for transmission across the isolation capacitor 104. The modulator circuit 102 includes an output 102A coupled to a terminal 104A of the isolation capacitor 104 for transmitting the modulated clock/data signal to the isolation capacitor 104.

The demodulator circuit 106 receives the modulated clock/data signal via the isolation capacitor 104, and demodulates the signal to reproduce the unmodulated clock/data signal. The demodulator circuit 106 includes an input 106A coupled to a terminal 104B of the isolation capacitor 104 for receipt of the modulated clock/data signal.

The clock data recovery circuit 108 receives the demodulated clock/data signal from the demodulator circuit 106, and recovers clock and data signals therefrom. The clock data recovery circuit 108 includes a signal input terminal 108A coupled to an output terminal 106B of the demodulator circuit 106 for receipt of the demodulated signal. The clock data recovery circuit 108 deglitches the demodulated signal received at the signal input terminal 108A, identifies logic ones and zeros in the signal based on the duration of a pulse of the deglitched data signal, and re-clocks the identified logic bits using the deglitched data signal. The recovered clock signal is provided at a recovered clock output terminal 108C, and the recovered data is provided at a recovered data output terminal 108B.

The circuit area of the isolator circuit 100 is reduced by transferring clock and data using a single modulator, isolation capacitor, and demodulator. Because the clock data recovery circuit 108 provides clock and data recovery without a DLL, the circuit area and power consumption of the clock data recovery circuit 108 is reduced relative to more complex clock data recovery circuits.

Figure 2:
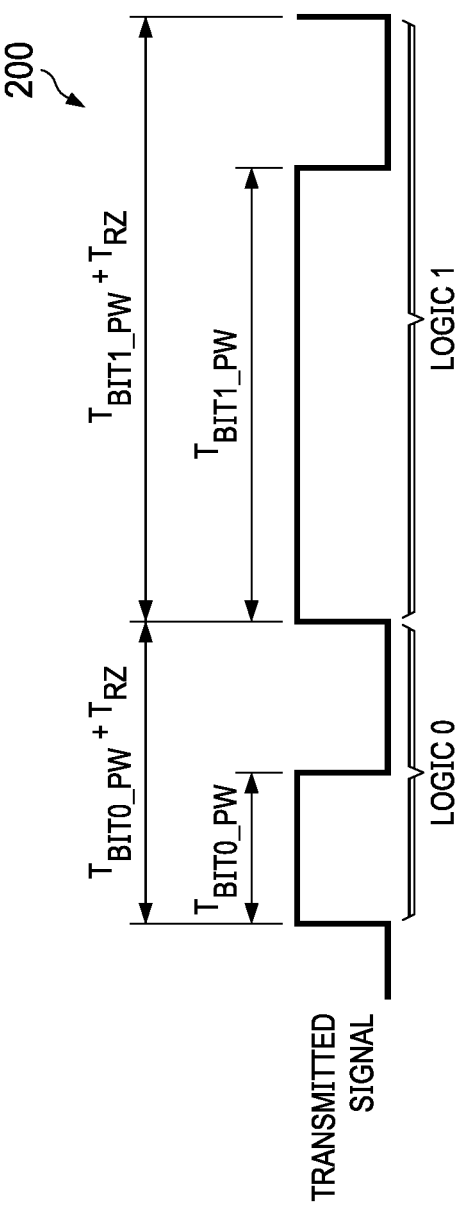
FIG. 2 shows an example signal provided to the isolator circuit of FIG. 1.

FIG. 2 shows an example signal 200 encoded for transmission in the isolator circuit 100. In the signal 200, a logic zero is encoded as a high signal level (a pulse) of duration $T_{BIT0\_PW}$ followed by a low signal level of duration $T_{RZ}$. A logic one is encoded as a high signal level (a pulse) of duration $T_{BIT1\_PW}$ followed by a low signal level of duration $T_{RZ}$. $T_{BIT1\_PW}$ is greater than $T_{BIT0\_PW}$. For example, $T_{BIT1\_PW}$ may be three times greater than $T_{BIT0\_PW}$. The clock data recovery circuit 108 compares the duration of a received pulse to a threshold duration ($T_{CDR\_THRESHOLD}$) to determine whether the received pulse encodes a logic zero or a logic one. If the width of a pulse is greater than $T_{CDR\_THRESHOLD}$, then the pulse encodes a logic one. If the width of a pulse is less than $T_{CDR\_THRESHOLD}$, then the pulse encodes a logic zero.

Figure 3:
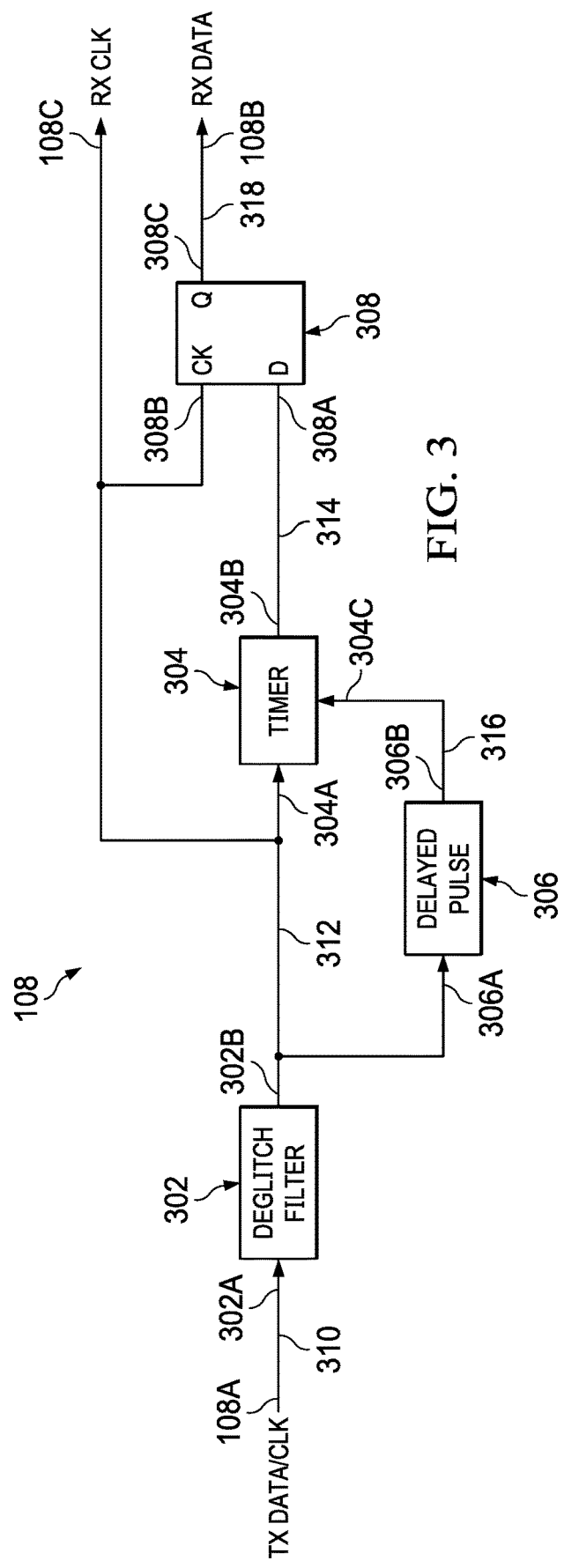
FIG. 3 shows a block diagram for an example clock data recovery circuit in accordance with this description.

FIG. 3 shows a block diagram for an example clock data recovery circuit 108 in accordance with this description. The clock data recovery circuit 108 includes a deglitch filter circuit 302, timer circuit 304, a delayed pulse circuit 306, and a flip-flop 308. The deglitch filter circuit 302 includes a data input terminal 302A coupled to the signal input terminal 108A for receipt of the demodulated clock data signal. The deglitch filter circuit 302 removes pulses that are less than a predetermined glitch duration from the demodulated signal, and provides a deglitched data signal at a deglitched data output terminal 302B. The deglitched data output terminal 302B of the deglitch filter circuit 302 is coupled to an input terminal 306A of the delayed pulse circuit 306, an enable terminal 304A of the timer circuit 304, a clock input 308B of the flip-flop 308, and the recovered clock output terminal 108C. The deglitched data signal produced by the deglitch filter circuit 302 is the recovered clock signal.

The delayed pulse circuit 306 receives the deglitched data signal produced by the deglitch filter circuit 302, and generates a reset pulse at a predetermined time (a delay time) after each leading edge of the deglitched data signal. The delayed pulse circuit 306 provides the reset pulse to the timer circuit 304. The delayed pulse circuit 306 includes a pulse output terminal 306B coupled to a reset terminal 304C of the timer circuit 304.

The timer circuit 304 receives the deglitched data signal produced by the deglitch filter circuit 302, and compares the duration of the pulses in the deglitched data signal to the threshold duration $T_{CDR\_THRESHOLD}$ to identify logic ones and logic zeros. Each pulse found to have a duration greater than $T_{CDR\_THRESHOLD}$ is deemed to encode a logic one, and each pulse found to have a duration less than $T_{CDR\_THRESHOLD}$ is deemed to encode a logic zero. The reset pulse received from the delayed pulse circuit 306 clears a last identified logic value to enable detection of the next logic value. The timer circuit 304 includes a bit output terminal 304B for communication of identified logic values to the flip-flop 308. The bit output terminal 304B of the timer circuit 304 is coupled to the data input 308A of the flip-flop 308 for transfer of identified logic values.

The flip-flop 308 stores a logic value identified by the timer circuit 304 at a rising edge of the deglitched data signal provided by the deglitch filter circuit 302. The flip-flop 308 includes an output 308C for providing a bit value to circuitry external to the clock data recovery circuit 108.

Figure 4:
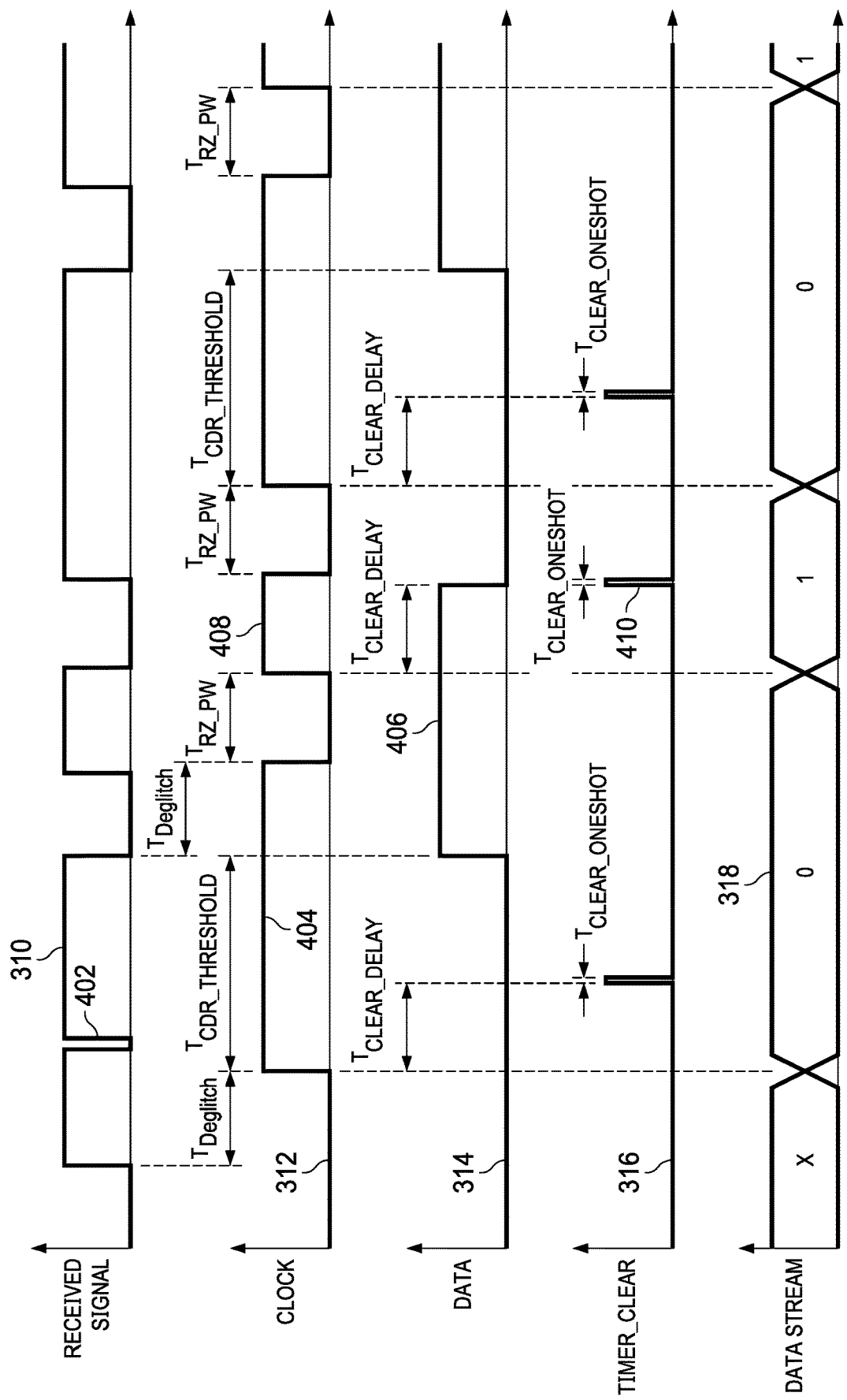
FIG. 4 shows example signals in the clock data recovery circuit of FIG. 3.

FIG. 4 shows example signals produced by operation of the clock data recovery circuit 108. FIG. 4 shows the demodulated signal 310 received by the deglitch filter circuit 302, the deglitched data signal 312 produced by the deglitch filter circuit 302, the data signal 314 identified by the timer circuit 304, the reset signal 316 generated by the delayed pulse circuit 306, and the recovered data 318 stored by the flip-flop 308. The demodulated signal 310 includes a glitch 402. The glitch 402 may be caused by a CMTI disturbance. The deglitch filter circuit 302 delays the demodulated signal 310 by a deglitch time ($T_{Deglitch}$), and removes the glitch 402 from the deglitched data signal 312. After a delay $T_{CLEAR\_DELAY}$ from the leading edge of each pulse of the deglitched data signal 312, the delayed pulse circuit 306 generates a pulse on the reset signal 316.

The timer circuit 304 measures the duration of each pulse of the deglitched data signal 312. The duration of the pulse 404 is greater than $T_{CDR\_THRESHOLD}$, and timer circuit 304 sets the data signal 314 to a logic one state 406 to indicate detection of a logic one in the pulse 404.

A delay time after the leading edge of the pulse 408, the delayed pulse circuit 306 generates the reset pulse 410, which resets the data signal 314 to produce a logic zero. The timer circuit 304 measures the duration of the pulse 408. The duration of the pulse 408 is less than $T_{CDR\_THRESHOLD}$, and the logic value output by the timer circuit 304 remains a logic zero.

The data signal 314 is clocked into the flip-flop 308 at each rising edge of the deglitched data signal 312 to produce the recovered data 318.

Figure 5:
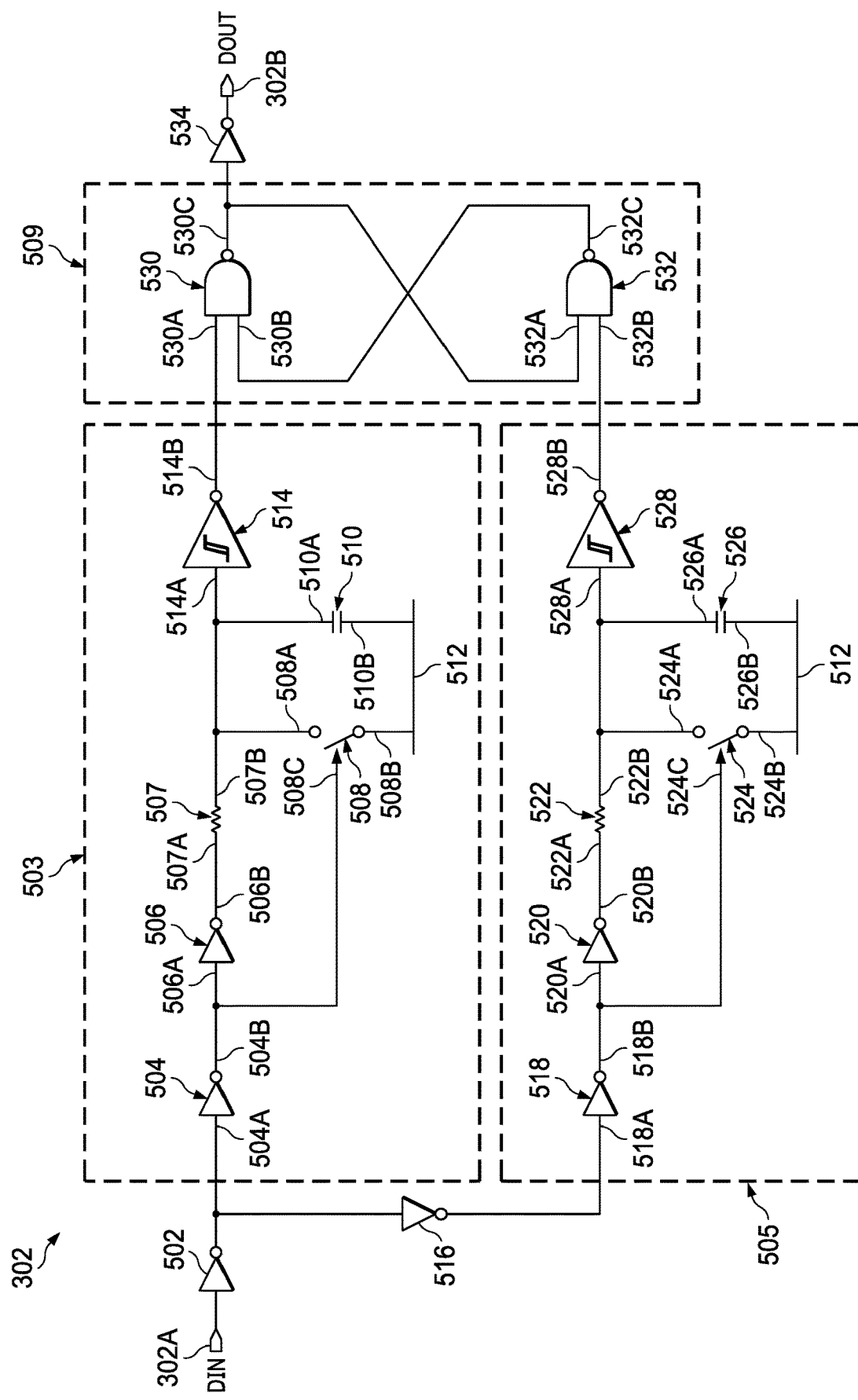
FIG. 5 shows an example deglitch filter circuit suitable for use in the clock data recovery circuit of FIG. 3.

FIG. 5 shows an example deglitch filter circuit 302. The deglitch filter circuit 302 includes a falling edge deglitch filter 503, a rising edge deglitch filter 505, and latch circuit 509. The falling edge deglitch filter 503 resets the latch circuit 509 when the demodulated signal 310 has been at a low logic level for a deglitch time. Similarly, the rising edge deglitch filter 505 sets the latch circuit 509 when the demodulated signal 310 has been at a logic high level for a deglitch time. Thus, the edges of the deglitched data signal 312 are delayed relative to the edges of the demodulated signal 310 by the deglitch time.

The falling edge deglitch filter 503 includes an inverter 504, an inverter 506, a resistor 507, a switch 508, a capacitor 510, and a Schmitt trigger circuit 514. An input 504A of the inverter 504 is coupled to the data input terminal 302A via the inverter 502. An output 504B of the inverter 504 is coupled to an input 506A of the inverter 506 and a control input 508C of the switch 508. An output 506B of the inverter 506 is coupled to a terminal 507A of the resistor 507. A terminal 507B of the resistor 507 is coupled to a terminal 508A of the switch 508, a terminal 510A of the capacitor 510, and an input 514A of the Schmitt trigger circuit 514. An output 514B of the Schmitt trigger circuit 514 is coupled to the latch circuit 509. When the demodulated signal 310 is a logic low value, the capacitor 510 charges through the resistor 507. When the voltage across the capacitor 510 exceeds the threshold of the Schmitt trigger circuit 514, the latch circuit 509 is set to generate a rising edge of the data signal 314. When the demodulated signal 310 is a logic low value, the switch 508 is closed to discharge the capacitor 510.

The rising edge deglitch filter 505 is similar to the falling edge deglitch filter 503, and includes an inverter 518, an inverter 520, a resistor 522, a switch 524, a capacitor 526, and a Schmitt trigger circuit 528. An input 518A of the inverter 518 is coupled to the data input terminal 302A via the inverters 502 and 516. An output 518B of the inverter 518 is coupled to an input 520A of the inverter 520, and a control input 524C of the switch 524. An output 520B of the inverter 520 is coupled to a terminal 522A of the resistor 522. A terminal 522B of the resistor 522 is coupled to a terminal 524A of the switch 524, a terminal 526A of the capacitor 526, and an input 528A of the Schmitt trigger circuit 528. An output 528B of the Schmitt trigger circuit 528 is coupled to the latch circuit 509. When the demodulated signal 310 is a logic low value, the capacitor 526 charges through the resistor 522. When the voltage across the capacitor 526 exceeds the threshold of the Schmitt trigger circuit 528, the latch circuit 509 is reset to generate a falling edge of the deglitched data signal 312. When the demodulated signal 310 is a logic high value, the switch 524 is closed to discharge the capacitor 526.

The latch circuit 509 includes NAND gate 530 and NAND gate 532 cross-coupled. The NAND gate 530 includes an input 530A (set input of the latch circuit 509) coupled to the output 514B of the Schmitt trigger circuit 514, and an input 530B coupled to an output 532C of the NAND gate 532. An output 530C of the NAND gate 530 (output of the latch circuit 509) is coupled to the deglitched data output terminal 302B via an inverter 534. The NAND gate 532 includes an input 532B (reset input of the latch circuit 509) coupled to the output 528B of the Schmitt trigger circuit 528, and an input 532A coupled to the output 530C of the NAND gate 530.

Figure 6:
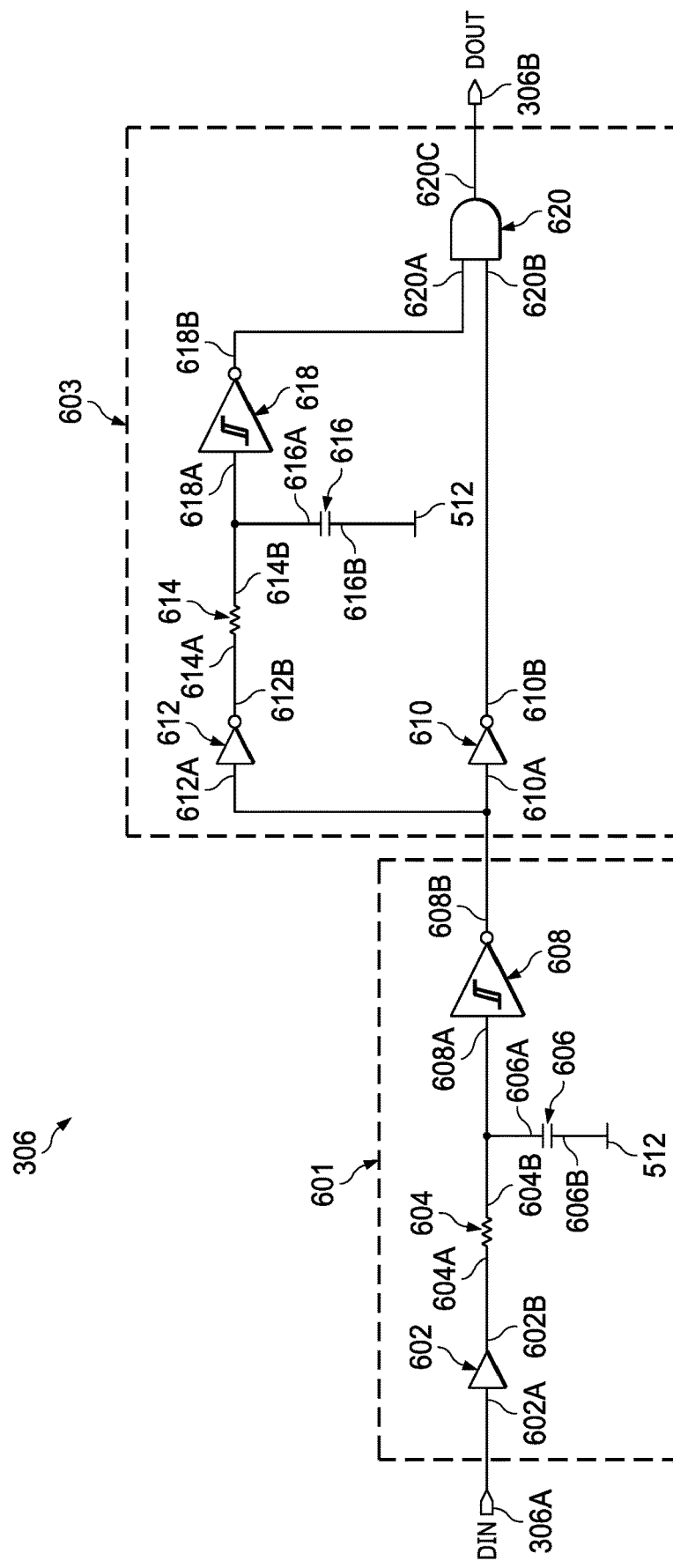
FIG. 6 shows an example delayed pulse circuit suitable for use in the clock data recovery circuit of FIG. 3.

FIG. 6 shows an example delayed pulse circuit 306. The delayed pulse circuit 306 includes a delay circuit 601 and a pulse generation circuit 603. The delay circuit 601 delays the deglitched signal 312, and includes a buffer circuit 602, a resistor 604, a capacitor 606, and a Schmitt trigger circuit 608. When the deglitched data signal 312 goes high, the capacitor 606 is charged, and when the voltage across the capacitor 606 exceeds the threshold of the Schmitt trigger circuit 608, the output of the Schmitt trigger circuit 608 goes low. The delay from the leading edge of the deglitched data signal 312 to the pulse on the reset signal 316 is defined by the time needed to charge the capacitor 606. The buffer circuit 602 includes an input 602A coupled to the input terminal 306A, and an output 602B coupled to a terminal 604A of the resistor 604. A terminal 604B of the resistor 604 is coupled to an input 608A of the Schmitt trigger circuit 608 and a terminal 606A of the capacitor 606. A terminal 606B of the capacitor 606 is coupled to ground.

The pulse generation circuit 603 includes an inverter 610, an inverter 612, a resistor 614, a capacitor 616, a Schmitt trigger circuit 618, and an AND gate (a logic gate) 620. An input 610A of the inverter 610 and an input 612A of the inverter 612 are coupled to the output 608B of the Schmitt trigger circuit 608. An output 610B of the inverter 610 is coupled to an input 620B of the AND gate 620. An output 620C of the AND gate 620 is coupled to the pulse output terminal 306B. An output 612B of the inverter 612 is coupled to a terminal 614A of the resistor 614. A terminal 614B of the resistor 614 is coupled to a terminal 616A of the capacitor 616 and an input 618A of the Schmitt trigger circuit 618. A terminal 616A of the capacitor 616 is coupled to ground. When the output of the Schmitt trigger circuit 608 transitions from high to low, the output of the AND gate 620 transitions from low to high to form the leading edge of the reset pulse 410, and the capacitor 616 is charged via the resistor 614. When the voltage across the capacitor 616 exceeds the threshold of the Schmitt trigger circuit 618, the output of the Schmitt trigger circuit 608 goes low and the reset pulse 410 is terminated. Thus, the width of the reset pulse 410 is defined by the pulse generation circuit 603.

Figure 7:
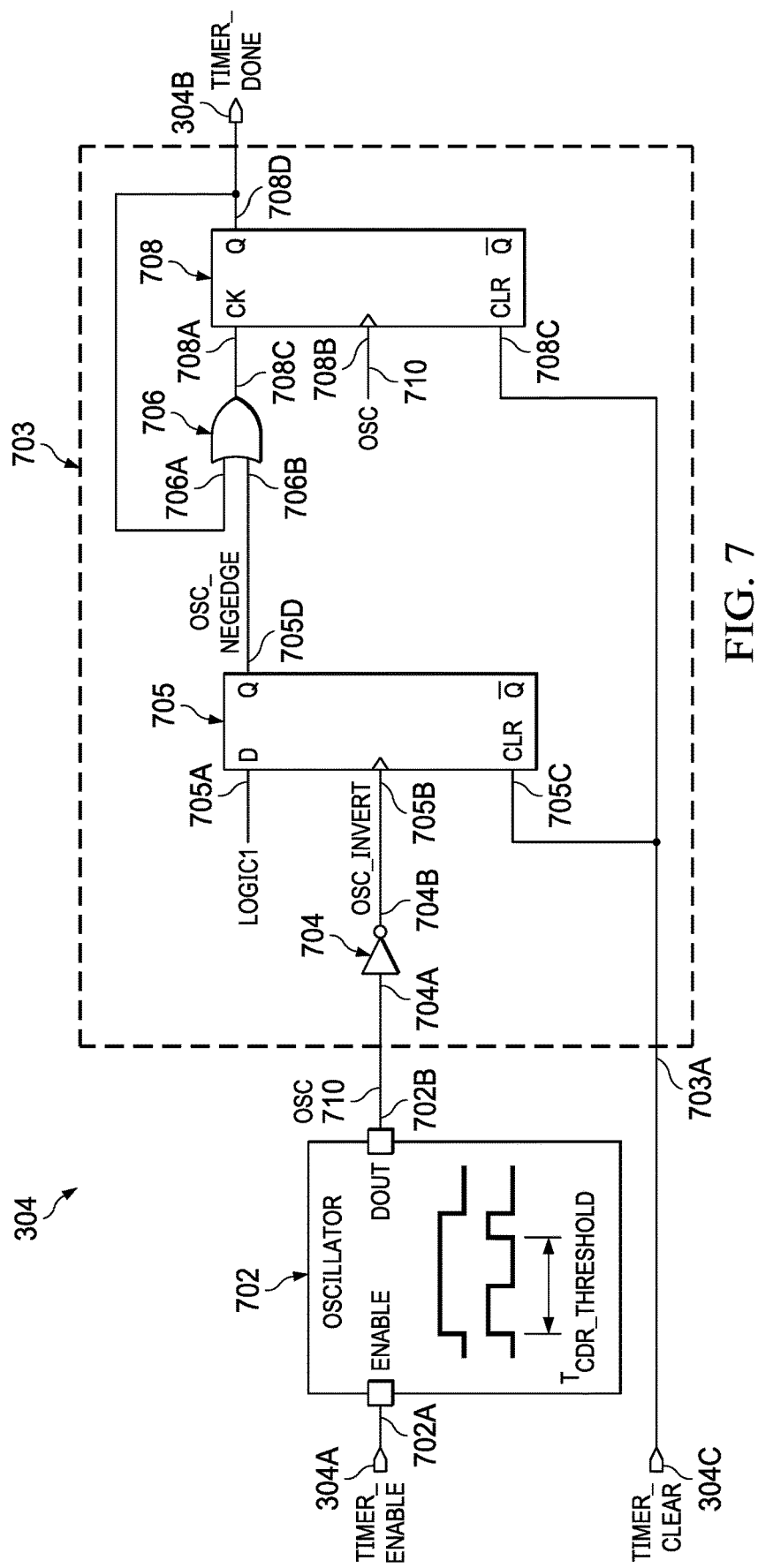
FIG. 7 shows an example timer circuit suitable for use in the clock data recovery circuit of FIG. 3.

FIG. 7 shows an example timer circuit 304. The timer circuit 304 includes an oscillator circuit 702 and a cycle detection circuit 703. The oscillator circuit 702 generates a clock signal having a period of $T_{CDR\_THRESHOLD}$. The oscillator circuit 702 includes an enable input 702A and a clock output 702B. The oscillator circuit 702 is enabled to generate a clock signal for the duration of each pulse on the deglitched data signal 312.

The cycle detection circuit 703 includes an inverter 704, a flip-flop 705, an OR gate (a logic gate) 706, and a flip-flop 708. The cycle detection circuit 703 identifies a cycle of the clock signal generated by the oscillator circuit 702. Identification of a full clock cycle indicates that the oscillator circuit 702 has been enabled for time $T_{CDR\_THRESHOLD}$, and the pulse enabling the oscillator circuit 702 encodes a logic one. The inverter 704 includes an input 704A (clock input terminal of the cycle detection circuit 703) coupled to the clock output 702B of the oscillator circuit 702. An output 704B of the inverter 704 is coupled to a clock input 705B of the flip-flop 705. A data input 705A of the flip-flop 705 is coupled to a logic high voltage source, and a clear input 705C of the flip-flop 705 is coupled to a clear terminal 703A of the cycle detection circuit 703 and the reset terminal 304C. An output 705D of the flip-flop 705 is coupled to an input 706B of the OR gate 706. The flip-flop 705 detects a falling edge of the clock generated by the oscillator circuit 702, thereby indicating the generation of previous rising edge of the clock. The flip-flop 705 is reset by the reset pulse on the reset signal 316.

An output 706C of the OR gate 706 is coupled to a data input 708A of the flip-flop 708. A clock input 708B of the flip-flop 708 is coupled to the clock output 702B of the oscillator circuit 702, and a clear input 708C of the flip-flop 708 is coupled to the clear terminal 703A of the cycle detection circuit 703 and the reset terminal 304C. An output 708D of the flip-flop 708 (cycle complete terminal of the cycle detection circuit 703) is coupled to the input 706A of the OR gate 706 and the bit output terminal 304B. The flip-flop 708 detects a rising edge of the clock following the falling edge detected by the flip-flop 705, thereby indicating the generation of a full cycle of the clock. A full cycle of the clock defines $T_{CDR\_THRESHOLD}$, and indicates that the pulse enabling the oscillator circuit 702 encodes a logic one. Thus, at the end of $T_{CDR\_THRESHOLD}$ the flip-flop 708 stores a logic one. After being set, the OR gate 706 holds the flip-flop 708 set until the flip-flop 708 is reset by the reset pulse on the reset signal 316.

Figure 8:
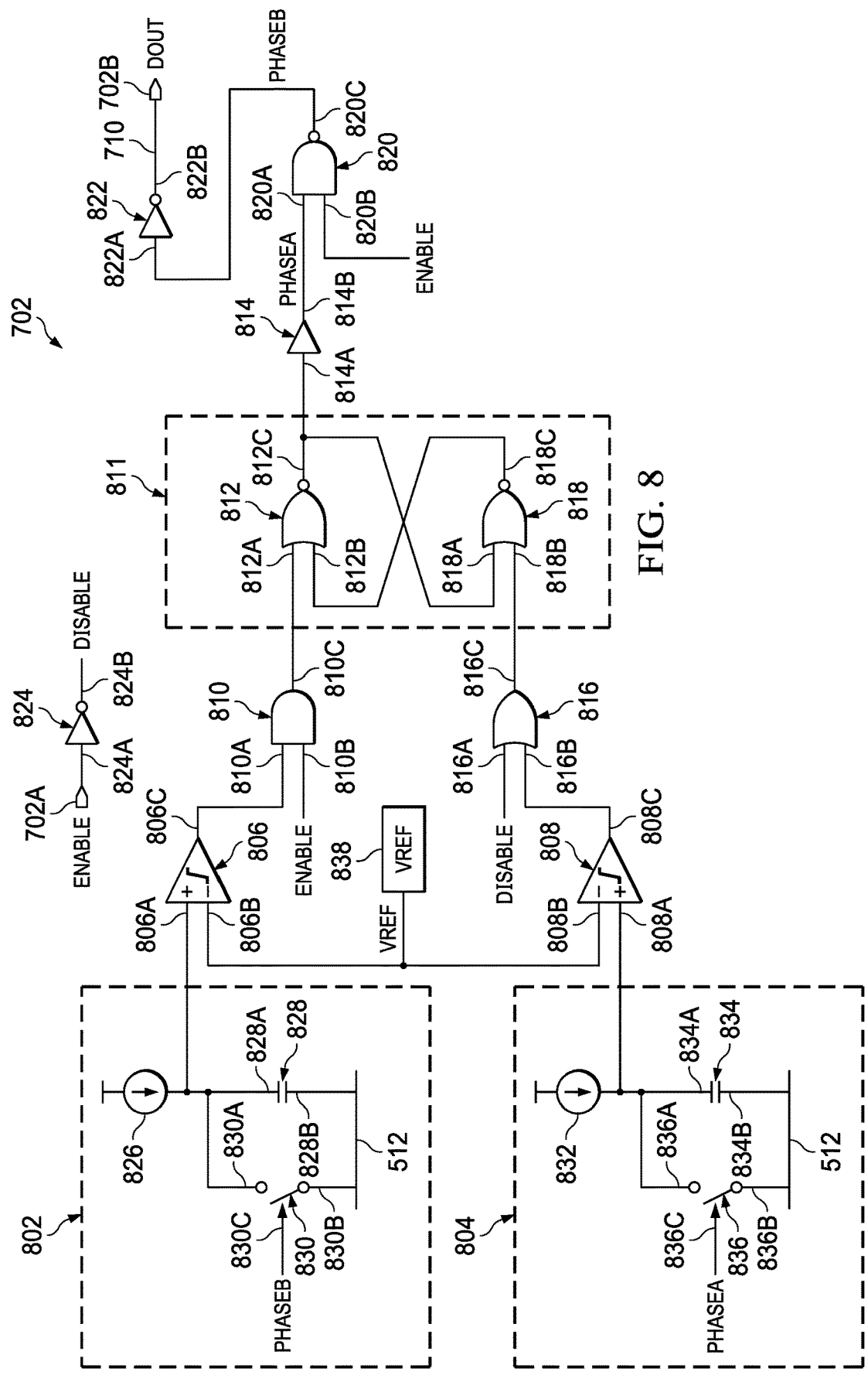
FIG. 8 shows an example oscillator circuit suitable for use in the timer circuit of FIG. 7.

FIG. 8 shows an example oscillator circuit 702. The oscillator circuit 702 generates a clock signal having a period of $T_{CDR\_THRESHOLD}$. The oscillator circuit 702 includes a ramp circuit 802, a ramp circuit 804, a comparator 806, a comparator 808, an AND gate 810, a latch circuit 811, a buffer 814, an OR gate 816, a NAND gate 820, an inverter 822, and an inverter 824. The inverter 824 inverts the deglitched data signal 312 received at the enable input 702A. The inverter 824 includes an input 824A coupled to the enable input 702A and an output 824B coupled to the OR gate 816.

The ramp circuit 802 sets the duration of the high portion (a high level) of clock cycle, and the ramp circuit 804 sets the duration of the low portion (a low level) of the clock cycle. The ramp circuit 802 includes a current source 826, a capacitor 828, and a switch 830. The current source 826 is coupled to a terminal 828A of the capacitor 828 and a terminal 830A of the switch 830. A terminal 828B of the capacitor 828 and a terminal 830B of the switch 830 are coupled to ground 512. A control terminal 830C of the switch 830 is coupled to output 820C of the NAND gate 820. When the oscillator circuit 702 is enabled (when the deglitched data signal 312 is high) and the clock signal 710 provided at clock output 702B is high, the switch 830 is open and the capacitor 828 is charged. The terminal 828A of the capacitor 828 is coupled to a terminal 806A of the comparator 806. When the voltage across the capacitor 828 exceeds a reference voltage provided at a terminal 806B of the comparator 806 by a reference voltage source 838, the signal at the output 806C of the comparator 806 changes state, and passes through the AND gate 810 to reset the latch circuit 811. The signal at the output of the latch circuit 811 goes low and the clock signal 710 goes low.

The comparator 806 is coupled to the latch circuit 811 via the AND gate 810. The AND gate 810 passes signal from the comparator 806 to the latch circuit 811 when the deglitched data signal 312 is high. The AND gate 810 includes an input 810A coupled to the output 806C of the comparator 806, an input 810B coupled to the enable input 702A, and an output 810C coupled to the latch circuit 811. The latch circuit 811 includes a NOR gate 812 and a NOR gate 818. The NOR gate 812 includes an input 812A (reset input of the latch circuit 811) coupled to the output 810C of the AND gate 810, and an input 812B coupled to the output 818C of the NOR gate 818. An output 812C of the NOR gate 812 is coupled to an input 818A of the NOR gate 818 and an input 814A of the buffer 814. An output 814B of the buffer 814 is coupled to an input 820A of the NAND gate 820. An input 820B of the NAND gate 820 is coupled to enable input 702A. An output 820C of the NAND gate 820 is coupled to an input 822A of the inverter 822. An output 822B of the inverter 822 is coupled the clock output 702B.

The ramp circuit 804 is similar to the ramp circuit 802. The ramp circuit 804 includes a current source 832, a capacitor 834, and a switch 836. The current source 832 is coupled to a terminal 834A of the capacitor 834 and a terminal 836A of the switch 836. A terminal 834B of the capacitor 834 and a terminal 836B of the switch 836 are coupled to ground 512. A control terminal 836C of the switch 836 is coupled to output 814B of the buffer 814. When the oscillator circuit 702 is enabled (when the deglitched data signal 312 is high) and the clock signal 710 provided at clock output 702B is low, the switch 836 is open and the capacitor 834 is charged. The terminal 834A of the capacitor 834 is coupled to a terminal 808A of the comparator 808. When the voltage across the capacitor 834 exceeds a reference voltage provided at a terminal 808B of the comparator 808 by the voltage reference source 838, the signal at the output 808C of the comparator 808 changes state, and passes through the OR gate 816 to set the latch circuit 811. The signal at the output of the latch circuit 811 goes high and the clock signal 710 goes high.

The comparator 808 is coupled to the latch circuit 811 via the OR gate 816. The OR gate 816 passes signal from the comparator 808 to the latch circuit 811 when the deglitched data signal 312 is high. The OR gate 816 includes an input 816B coupled to the output 808C of the comparator 808, an input 816A coupled to the output 824B of the inverter 824, and an output 816C coupled to the input 818B of the NOR gate 818 (set input of the latch circuit 811).

While the timer circuit 304 has been described as timing the pulses of the deglitched data signal 312 using an oscillator that generates a clock signal having period $T_{CDR\_THRESHOLD}$, some implementations of the timer circuit 304 apply a high-frequency clock and a counter to time the pulses of the deglitched data signal 312. For example, if a number of clock cycles counted during a pulse of the deglitched data signal 312 exceeds a predetermined number, then the pulse encodes a logic one.

In this description, the term "couple" or "couples" may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A clock data recovery circuit, comprising:
   a deglitch filter circuit including:
      a data input; and
      a deglitched data output;
   a timer circuit including:
      an enable input coupled the deglitched data output;
      a bit output; and
      a reset input;
   a delayed pulse circuit including:
      an input coupled to the deglitched data output; and
      a pulse output coupled to the reset input; and a latch including:
  a data input coupled to the bit output;
  a clock input coupled to the deglitched data output; and
  a recovered data output.

2. The clock data recovery circuit of claim 1, wherein the reset input is a first reset input, and the deglitch filter circuit includes:
  a falling edge deglitch filter including
    an input coupled to the data input; and
    an output;
  a rising edge deglitch filter including
    an input coupled to the data input; and
    an output; and
  latch circuitry including:
    a second reset input coupled to the output of the falling edge deglitch filter;
    a set input coupled to the output of the rising edge deglitch filter; and
    an output coupled to the deglitched data output.

3. The clock data recovery circuit of claim 2, wherein: the falling edge deglitch filter includes:
  a first inverter including:
    a first inverter input coupled to the data input; and
    a first inverter output;
  a second inverter including:
    a second inverter input coupled to the first inverter output; and
    a second inverter output;
  a first resistor including:
    a first resistor terminal; and
    a second resistor terminal coupled to the second inverter output;
  a first capacitor coupled between the first resistor terminal and a ground terminal;
  a first switch coupled between the first resistor terminal and the ground terminal, the first switch including a first control input coupled to the first inverter output; and
  a first Schmitt trigger circuit including:
    an input coupled to the first resistor terminal; and
    an output coupled to the second reset input; and
  the rising edge deglitch filter includes:
  a third inverter including:
    a third inverter input coupled to the data input; and
    a third inverter output;
  a fourth inverter including:
    a fourth inverter input coupled to the third inverter output; and
    a fourth inverter output;
  a second resistor including:
    a third resistor terminal; and
    a fourth resistor terminal coupled to the fourth inverter output;
  a second capacitor coupled between the third resistor terminal and the ground terminal;
  a second switch coupled between the third resistor terminal and the ground terminal, the second switch including a second control input coupled to the third inverter output; and
  a second Schmitt trigger circuit including:
    an input coupled to the third resistor terminal; and
    an output coupled to the set input of the latch circuitry.

4. The clock data recovery circuit of claim 1, wherein the delayed pulse circuit includes:
  a delay circuit including:
    an input coupled to the input of the delayed pulse circuit; and
    an output; and
  a pulse generation circuit including:
    an input coupled to the output of the delay circuit; and
    an output coupled to the pulse output.

5. The clock data recovery circuit of claim 4, wherein: the delay circuit includes:
  a first resistor including:
    a first resistor terminal; and
    a second resistor terminal coupled to the input of the delayed pulse circuit;
  a first capacitor coupled between the first resistor terminal and a ground terminal;
  a first Schmitt trigger circuit including:
    an input coupled to the first resistor terminal; and
    an output; and
  the pulse generation circuit includes:
  a second resistor including:
    a third resistor terminal; and
    a fourth resistor terminal coupled to the output of the first Schmitt trigger circuit;
  a second capacitor coupled between the third resistor terminal and the ground terminal;
  a second Schmitt trigger circuit including:
    an input coupled to the third resistor terminal; and
    an output;
  a logic gate including:
    a first input coupled to the output of the first Schmitt trigger circuit;
    a second input coupled to the output of the second Schmitt trigger circuit; and
    an output coupled to the pulse output.

6. The clock data recovery circuit of claim 1, wherein the enable input is a first enable input, and the timer circuit includes:
  an oscillator circuit including:
    a second enable input coupled to the first enable input; and
    a clock output; and
  a cycle detection circuit including:
    a clock input coupled to the clock output of the oscillator circuit;
    a clear input coupled to the reset input; and
    a cycle complete output coupled to the bit output.

7. The clock data recovery circuit of claim 6, wherein the cycle detection circuit includes:
  first latch circuitry including:
    a first clock input coupled to the clock output of the oscillator circuit;
    a first data input coupled to a voltage source terminal;
    a first clear input coupled to the reset input; and
    a first latch output;
  second latch circuitry including:
    a second clock input coupled to the clock output of the oscillator circuit;
    a second data input;
    a second clear input coupled to the reset input; and
    a second latch output coupled to the bit output; and
  a logic gate including:
    a first input coupled to the first latch output;
    a second input coupled to the second latch output; and
    an output coupled to the second data input.

8. The clock data recovery circuit of claim 6, wherein the reset input is a first reset input, and the oscillator circuit includes:
  a first ramp circuit;
  a first comparator including:
    a first input coupled to the first ramp circuit;
    a second input coupled to a voltage reference terminal; and
    a first comparator output;
  a second ramp circuit;
  a second comparator including:
    a first input coupled to the second ramp circuit;
    a second input coupled to the voltage reference terminal; and
    a second comparator output;

latch circuitry including:
  a set input coupled the first comparator output;
  a second reset input coupled to the second comparator output; and
  an output coupled to the clock output of the oscillator circuit.

* * * * *